United States Patent [19]
Rockwell et al.

[11] 3,812,928
[45] May 28, 1974

[54] ELECTRIC POWERED WHEEL

[75] Inventors: Harvey W. Rockwell, Springfield, Ill.; William L. Ringland, Greendale, Wis.

[73] Assignee: Allis-Chalmers Corporation, Milwaukee, Wis.

[22] Filed: May 12, 1972

[21] Appl. No.: 252,633

[52] U.S. Cl. ............... 180/65 F, 74/801, 105/55, 310/54, 310/67 R, 310/77, 310/83
[51] Int. Cl. .......................................... B60k 7/00
[58] Field of Search..... 180/65 F, 66 F, 65 R, 65 A, 180/60, 55, 62, 56; 105/53, 54, 55, 97; 310/77, 54, 83, 67; 74/801

[56] References Cited
UNITED STATES PATENTS

| | | | |
|---|---|---|---|
| 680,804 | 8/1901 | Newman et al. | 310/67 R |
| 1,241,870 | 10/1917 | Megow | 74/801 |
| 1,366,325 | 1/1921 | Perin | 74/801 |
| 1,405,430 | 2/1922 | Owens | 74/801 |
| 2,941,423 | 6/1960 | Armington et al. | 180/43 B UX |
| 3,055,448 | 9/1962 | Fagel | 180/65 F UX |
| 3,163,250 | 12/1964 | Gibson | 180/65 F UX |
| 3,217,193 | 11/1965 | Rayner | 310/54 |
| 3,482,806 | 12/1969 | Trautzsch et al. | 310/67 R X |

FOREIGN PATENTS OR APPLICATIONS

| | | | |
|---|---|---|---|
| 454,464 | 10/1936 | Great Britain | 180/65 F |

*Primary Examiner*—David Schonberg
*Assistant Examiner*—Milton L. Smith

[57] ABSTRACT

A compact electric wheel unit using a high torque, moderate speed inside out electric motor and a planetary speed reducer wherein a friction brake is mounted on a stationary ring gear component of the planetary gearing. In one embodiment, lubricating and cooling fluid is circulated through the motor, gear train and brake.

22 Claims, 2 Drawing Figures

ELECTRIC POWERED WHEEL

BACKGROUND OF THE INVENTION

Heretofore a variety of electric wheels have been proposed, including the constructions shown in U.S. Pat. Nos. 1,270,421; 1,577,304; 1,747,560; 1,997,974; 2,273,840; 2,348,053; 2,441,801; 2,514,460; and 3,482,806.

BRIEF DESCRIPTION OF THE INVENTION

The electric wheel unit of this invention is a compact assembly including a high torque moderate speed inside out electric motor mounted on a nonrotating spindle. A planetary speed reducing gear system is interposed between the rotor of the electric motor and a wheel, and a friction type brake interposed between the wheel and a nonrotating component of the planetary gear system.

DETAILED DESCRIPTION OF THE INVENTION

Figure 1:
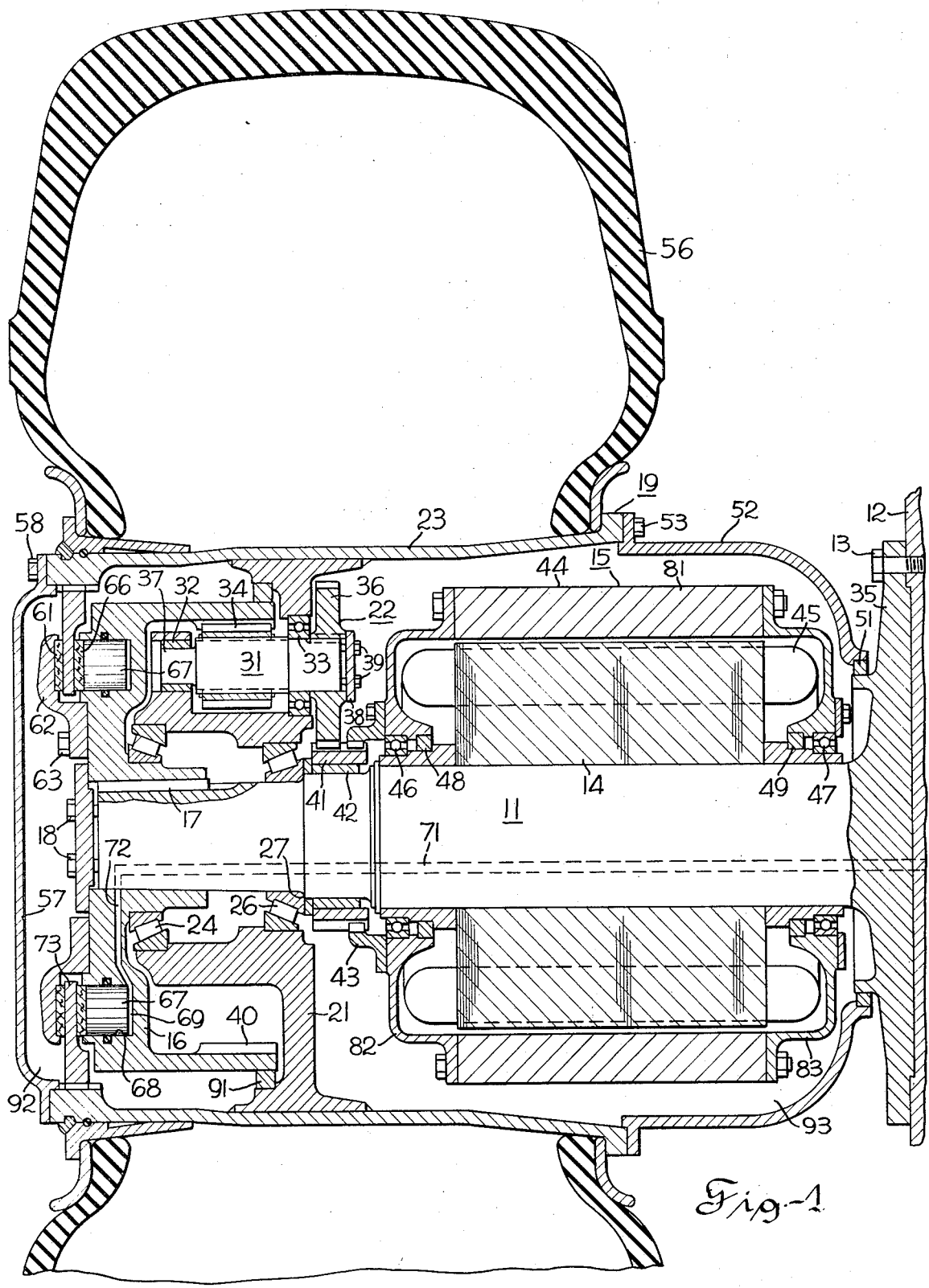
FIG. 1 is a section view of an electric wheel assembly incorporating the present invention.

Referring to FIG. 1, an electric wheel assembly includes a nonrotating axle or spindle 11 which has an annular flange 35 at one end releasably secured to a frame member 12 of a vehicle by a plurality of cap screws 13. The electric wheel assembly is driven by an inside out electric motor 15 which has a stator 14 nonrotatably secured to the spindle 11 by suitable means (not shown) and a rotor 44 with a solid steel core 81. Armature windings 45 are incorporated into the stator in a conventional manner.

A wheel 19 includes a hub 21 which is the carrier member of a planetary gear train 22 and has integrally welded thereto a tire rim 23. The hub 21 is carried on the spindle 11 by a pair of antifriction bearings 24, 26. The antifriction bearing 26 mounts against a shoulder 27 on the spindle 11 and the bearing 24 is mounted on a ring gear 16 secured to the outer end of the spindle by a key 17 and cap screws 18. Proper adjustment of the bearings is achieved by axially positioning the ring gear 16 on the spindle 11 by the cap screws 18. The planet carrier or hub 21 carries a plurality of planet gear clusters 31 in bearings 32, 33. The planet gear clusters 31 each include a pair of gears 34, 36 nonrotatably secured to a shaft 37 at axially opposite sides of the hub 21. In order to facilitate assembly and disassembly, the planetary gear 34 is in splined engagement with the shaft 37 and held in place by a pair of snap rings and the gear 36 is keyed to the right end of the shaft 37 and held in place by a plate 38 and cap screws 39. The inner diameter of the teeth 40 of ring gear 16 is such as to permit axial withdrawal of the ring gear to the left without interfering with the planet carrier 21. The planet gear 36 meshes with a ringlike sun gear 41 which encircles and is rotatably mounted on the spindle 11 by a bearing 42 and has a splined connection with an internally toothed flange member 43 secured to a bell housing 82 of the rotor 44 of the inside out electric motor 15.

The bell housings 82, 83 of the rotor 44 are mounted on the rotor 44 by a pair of antifriction bearings 46, 47.

A pair of seals 48, 49 are located on the axially inner sides of the bearings 46, 47 to prevent lubricant from getting into the interior of the motor 15 which preferably operates in a dry atmosphere. A lubricant seal 51 is interposed between a shoulder of the spindle 11 and an annular inwardly projecting housing part 52 which is secured to the wheel rim 23 by a plurality of cap screws 53.

The rim 23 carries a conventional tire 56 and its axially outer end is covered by an annular hubcap 57 secured to the rim by cap screws 58. A caliper disk friction brake is provided for the wheel wherein the components are mounted in the ring gear member 16. A friction pad 61 is secured to an outwardly extending flange member 62 which in turn is secured to ring gear member 16 by cap screws 63 and a friction pad 66 is operatively associated with a hydraulic piston 67 mounted in a bore 68 of the ring gear member 16. Hydraulic fluid is conveyed to a pressure chamber 69 in the bore 68 by a passage 71 in the spindle 11 and passage 72 in ring gear member 16. The friction pads 61, 66 are in confronting engageable relation to axially opposite sides of a brake disk 73 which is in axially shiftably splined relation to the wheel rim 23. Thus the disk is nonrotatably connected to the outer end of the rim 23 by a splined connection which permits the disk to float axially to achieve a centered position between the friction pads 61, 66.

The electric motor 15 may be designed in the manner of any one of various known types of alternating current motors. The rotor may include a laminated core and squirrel cage windings or may be of the solid steel core type as illustrated. The motor may also be designed as a synchronous motor. In the embodiment of FIG. 1, the motor 15 is a dry motor and is maintained in that condition by seals 48, 49. A seal 91 between the ring gear 16 and the hub 21 keeps lubricant from entering the cavity 92 in the axially outer end of the wheel assembly in which the dry type disk brake is disposed. A suitable type and quantity of liquid lubricant is included within the cavity 93 to provide splash lubrication of the motor bearings 46, 47, the wheel bearings 24, 26, the planet cluster bearings 32, 33, sun gear bearings 42, and the gears of planetary gear train 22.

Figure 2:
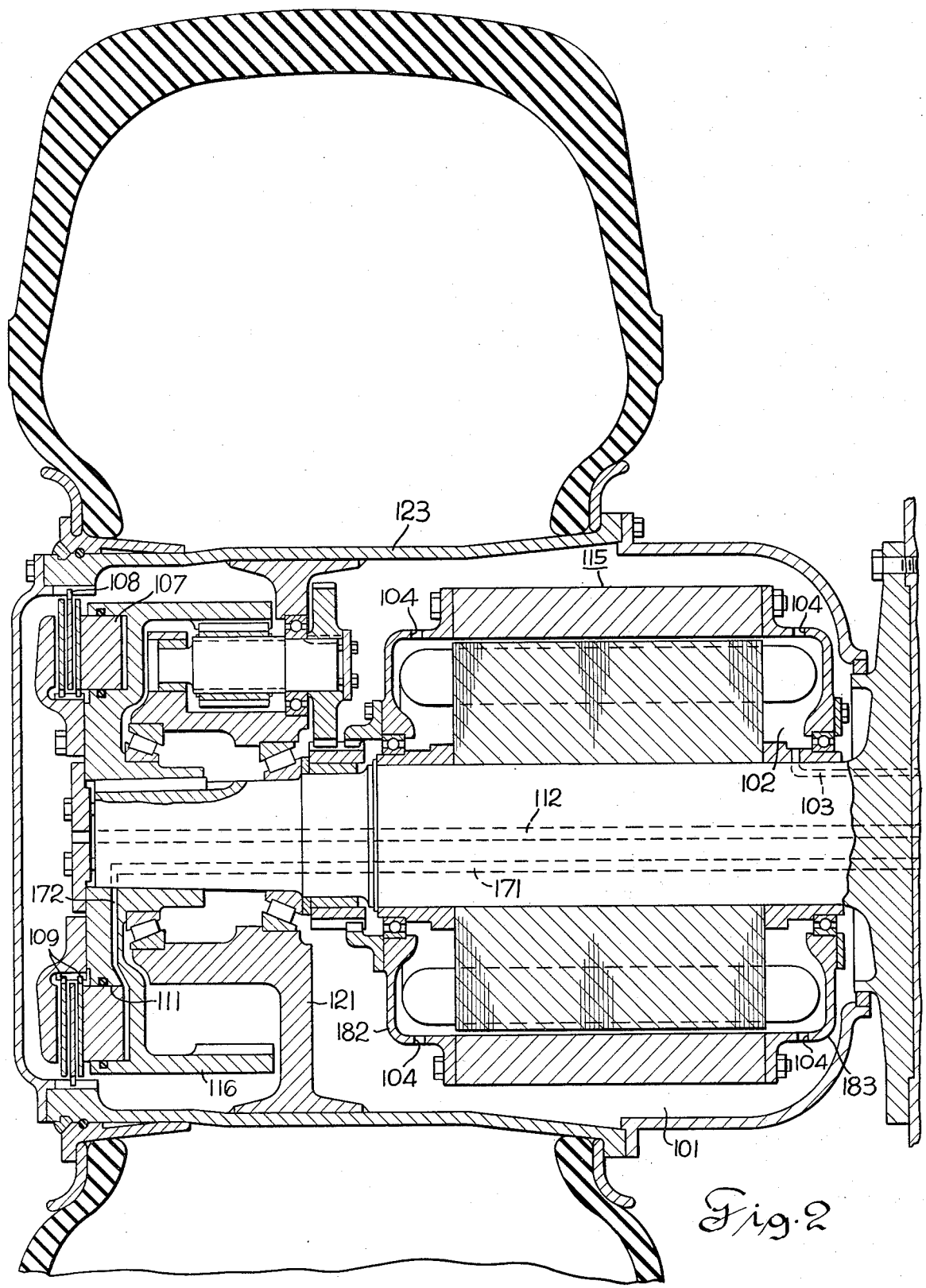
FIG. 2 is a section view of a second embodiment of the present invention.

In the embodiment of FIG. 2, a single interior cavity 101 is provided by eliminating the motor seals and the seal between the ring gear 116 and the wheel hub 121. A suitable cooling and lubricating fluid is circulated through the cavity 101 of the wheel assembly by pumping the filtered fluid from a source, not shown, to the interior cavity 102 of the motor 115 by way of input passage 103. Openings 104 are provided in the bell ends 182, 183 to permit the lubricating and cooling fluid to flow freely from cavity 102. The brake for the embodiment of FIG. 2 is a multiple disk type brake with an annular actuator or piston 107. As shown, the rim 123 carries a disk 108 and the ring gear 116 carries a pair of disks 109. The piston 107 and a cylinder in the form of an annular recess 111 constitute a fluid actuator in ring gear 116 to which pressure fluid is supplied via passages 171, 172. Lubricating and cooling fluid flows from the cavity 101 by way of passage 112 which is connected to a heat exchanger, not shown, to cool the fluid before passing through a filter, not shown, and pump, not shown, enroute back to the input passage 103.

OPERATION

When the electric motor is energized, the rotor will rotate, thus driving sun gear 41, which in turn rotates planet gear 36 of gear cluster 31. Gear 34 of gear cluster 31 meshes with stationary ring gear 16 thereby forcing the planet carrier 21 to rotate at a speed which is less than the speed of sun gear 41. The caliper disk type friction brake operatively interposed between the wheel and the ring gear 16 is hydraulically actuated by a source of pressure fluid with appropriate conventional controls. It will be noted that the solid steel core 81 of the rotor 44 is a structural member, thus producing a very compact construction.

The planetary gear train is of the compound type and operates as a speed reducer and torque multiplier. The hub of the wheel doubles as a planet carrier thus reducing weight, and parts and contributing to compactness in the overall design.

The embodiments of the invention in which an exclusive property or privilege is claimed are defined as follows:

1. An electric drive wheel assembly comprising:
    a nonrotating support axle adapted at one end for mounting on a vehicle,
    an electric drive motor including
        a stator nonrotatably secured to said axle adjacent said one end,
        a rotor having a core portion is radially outward spaced and circumferentially surrounding relation to said stator and end portions at opposite axial ends of said stator, and
        bearing means between said end portions and said axle rotatably mounting said rotor thereon,
    a ground engaging wheel including a tire rim and a hub secured to and extending radially inwardly from said rim,
    bearing means rotatably mounting said hub on the other end of said axle at the axial side of said stator remote from said one end,
    a planetary gear train between said rotor and wheel including
        a ring gear nonrotatably secured to said other end of said axle,
        a sun gear encircling said other end of said axle and nonrotatably secured to said rotor and
        a plurality of planet clusters rotatably mounted on said hub radially between said bearing means and said rim, each of said planet clusters including a first gear disposed on one axial side of said hub and meshing with said sun gear and a second gear disposed on the other axial side of said hub and meshing with said ring gear.

2. The invention of claim 1 and further comprising brake means including
    a first friction component nonrotatably secured to said wheel,
    a second friction component nonrotatably secured to said ring gear, and
    a brake actuator mounted on said ring gear element and operable to effect braking engagement of said friction components.

3. The invention of claim 2 wherein said brake actuator is fluid operated.

4. The invention of claim 1 and further comprising brake means including
    a first friction component nonrotatably secured to said wheel,
    a second friction component nonrotatably connected to said other end of said axle, and
    a brake actuator supported on said other end of said axle.

5. The invention of claim 1 and further comprising brake means including a brake disk connected to rotate with and float axially relative to said wheel, friction means mounted on the other end of said axle in confronting relation to said disk, and an actuator on said other end of said axle selectively operable to cause said friction means to engage said disk thereby braking said wheel.

6. A drive wheel assembly comrpising:
    a nonrotating support axle adapted at one end for mounting on a vehicle,
    a ground engaging wheel including
        a tire rim,
        a hub secured to and extending radially inward from said rim and
        bearing means rotatably mounting the radially inner portion of said hub on the other end of said axle, and
    a planetary gear train operatively associated with said axle and wheel including
        a sun gear at one axial side of said bearing means,
        a ring gear nonrotatably secured to said axle at the other axial side of said bearing means, and
        a plurality of planet gear clusters rotatably mounted on said hub radially between said rim and said bearing means, each of said gear clusters having a large gear on one axial side of said hub in mesh with said sun gear and a small gear on the other axial side of said hub in mesh with said ring gear.

7. The combination of claim 6 and further comprising brake means including a first friction component connected for rotation with said wheel, a second friction component nonrotatably secured to said ring gear and an actuator mounted on said ring gear and operable to effect braking engagement of said friction components.

8. The invention of claim 7 wherein said actuator is fluid operated.

9. The invention of claim 8 wherein said first friction component is a disk releasably secured at its outer periphery to said wheel for rotation therewith.

10. The invention of claim 9 wherein said disk is axially shiftable relative to said wheel.

11. The invention of claim 8 wherein said wheel includes a rim for mounting a tire and wherein said first friction component is a disk having its radially outer periphery secured to said axially outer portion of said rim.

12. The invention of claim 11 wherein the connection between said disk and rim allows said disk to float axially.

13. The invention of claim 12 wherein said actuator includes a cylinder on said ring gear and a piston in said cylinder in axial thrust transmitting relation to second friction component.

14. The invention of claim 13 wherein said brake means is a multiple disk, fluid cooled brake.

15. The invention of claim 6 and further comprising an electric motor having a rotor connected in driving relation to said sun gear and a stator nonrotatably mounted on said axle.

16. The invention of claim 15 and further comprising brake means including a first friction component connected for rotation with said wheel, a second friction component nonrotatably secured to said ring gear and an actuator mounted on said ring gear and operable to effect braking engagement of said friction components.

17. The invention of claim 16 wherein said actuator is fluid operated and includes a piston reciprocably disposed within a complementary bore in said ring gear in thrust transmitting relation to said second friction component.

18. The invention of claim 17 wherein said first friction component is an annular disk connected to rotate with and shift axially relative to said wheel.

19. The invention of claim 18 wherein said wheel includes a rim adapted to receive a rubber tire and said disk is connected to and extends radially inward from an axially outer portion of said rim.

20. An electric drive wheel assembly comprising:
a nonrotating support axle adapted at one end for mounting on a vehicle,
an electric drive motor including
a stator nonrotatably secured to said axle adjacent said one end,
a rotor having a core portion in radially outward spaced and circumferentially surrounding relation to said stator and end portions at opposite axial ends of said stator, and
bearing means between said end portions and said axle rotatably mounting said rotor thereon,
a ground engaging wheel including a hub and a tire rim,
bearing means rotatably mounting said hub on the other end of said axle at the axial side of said stator remote from said one end,
a planetary gear train between said rotor and wheel including a sun gear element, a planet carrier element and a ring gear element,
means nonrotatably securing a first of said elements to said other end of said axle,
means connecting a second of said elements in driven relation to said rotor,
means nonrotatably connecting a third of said elements to said wheel,
brake means including
a first friction component nonrotatably secured to said wheel,
a second friction component nonrotatably secured to said other end of said axle, and
a brake actuating member mounted on said other end of said axle,
a hub cap member secured in fluid tight relation to the axial side of said rim remote from said one end of said axle,
an annular housing part secured to the axial side of said rim adjacent said one end of said axle,
fluid tight seal means between said housing part and said one end of said axle, and
passage means in said axle permitting circulation of lubricating and cooling fluid through said wheel assembly.

21. The invention of claim 20 wherein said brake means is a multiple disk brake having a plurality of disks nonrotatably secured to said axle.

22. The invention of claim 21 wherein said disks and brake actuating member are mounted on said first of said elements.

* * * * *